United States Patent
Kuribayashi et al.

(10) Patent No.: US 7,067,954 B2
(45) Date of Patent: Jun. 27, 2006

(54) AUTOMOTIVE ROTARY ELECTRIC MACHINE

(75) Inventors: Masaru Kuribayashi, Tokyo (JP); Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/965,860

(22) Filed: Oct. 18, 2004

(65) Prior Publication Data
US 2005/0088056 A1    Apr. 28, 2005

(30) Foreign Application Priority Data
Oct. 23, 2003    (JP) .............................. 2003-363553

(51) Int. Cl.
*H02K 1/12*    (2006.01)
*H02K 1/22*    (2006.01)
(52) U.S. Cl. ..................................... 310/263
(58) Field of Classification Search .............................
310/156.66–156.73, 263
See application file for complete search history.

(56) References Cited
U.S. PATENT DOCUMENTS
5,903,084 A    5/1999    Asao et al.
6,002,194 A    12/1999    Asao
6,531,802 B1 *    3/2003    Umeda ........................ 310/263
6,703,759 B1 *    3/2004    Oohashi et al. ............. 310/263
2001/0000291 A1    4/2001    York et al.

FOREIGN PATENT DOCUMENTS

| | | | |
|---|---|---|---|
| EP | 0910155 | 4/1999 | |
| FR | 2 786 625 | 6/2000 | |
| JP | 4-165950 | * 6/1992 | ................. 310/263 |
| JP | 08308190 | 11/1996 | |
| JP | 09098556 | 4/1997 | |
| JP | 10201149 | 7/1998 | |
| JP | 11164499 | 6/1999 | |
| JP | 2990810 B2 | 10/1999 | |
| JP | 2001086715 | 3/2001 | |

* cited by examiner

*Primary Examiner*—Tran Nguyen
(74) *Attorney, Agent, or Firm*—Sughrue Mion, PLLC

(57) ABSTRACT

First and second permanent magnets are each disposed between circumferentially-adjacent pairs of first and second claw-shaped magnetic pole portions so as to contact a circumferential side surface of the first and second claw-shaped magnetic pole portions. An axial length ($L_1$) of a stator core relative to an axial distance ($L_2$) between facing end surfaces of first and second yoke portions is constructed so as to satisfy an expression $L_1 > L_2$.

4 Claims, 14 Drawing Sheets

Fig. A is perspective schematically showing a substantial part of an automotive rotary electric machine shown in Figs. 9 or 12.

Fig. B is perspective schematically showing a substantial part of an automotive rotary electric machine shown in Fig. 10.

Fig. C is perspective schematically showing a substantial part of an automotive rotary electric machine shown in Fig. 11.

AUTOMOTIVE ROTARY ELECTRIC MACHINE

BACKGROUND OF THE INVENTION

1. Field of the Invention

The present invention relates to an automotive rotary electric machine having permanent magnets disposed between claw-shaped magnetic pole portions of a rotor, and particularly to a permanent magnet shape relative to a claw-shaped magnetic pole shape in order to achieve improvements in various characteristics.

2. Description of the Related Art

In conventional automotive rotary electric machines, an outer peripheral surface shape of claw-shaped magnetic pole portions of a rotor core is formed so as to have a trapezoidal shape constituted by a tip end short side, a base end portion long side, and two oblique sides, permanent magnets being disposed between the claw-shaped magnetic pole portions. With objectives of preventing battery overcharge and of achieving high efficiency and high output, the claw-shaped magnetic pole portions and the permanent magnets are constructed so as to satisfy $0.2 \leq Br\{L/(W \cos \theta)\} \leq 0.8$, where $Br$ is a residual magnetic flux density of the permanent magnets, $L$ is a magnetic pole portion length from the tip end short side of the claw-shaped magnetic pole portions to the base end portion long side, $W$ is a length of the base end portion long side of the claw-shaped magnetic pole portions, and $2\theta$ is an angle formed by the two oblique sides of the claw-shaped magnetic pole portions. (See Patent Literature 1, for example.)

Patent Literature 1: Japanese Patent No. 2990810 (Gazette)

In conventional automotive rotary electric machines, since no consideration has been given to ineffective magnetic flux generated when magnetic flux flowing through the rotor core is saturated at the base end portions of the claw-shaped magnetic pole portions, magnetic flux arising due to field current flowing through the field winding has not been utilized effectively.

Because the permanent magnets disposed between the claw-shaped magnetic pole portions are formed so as to have a rectangular shape in which a circumferential side surface shape has a length from the tip end short side of the claw-shaped magnetic pole portions to the base end portion long side as a long side and a base end portion radial length of the claw-shaped magnetic pole portions as a short side, additional magnetic flux from the permanent magnets has not been used efficiently since a portion of the circumferential side surface of the permanent magnets does not come into contact with the circumferential side surface of the claw-shaped magnetic pole portions on an inner radial side.

SUMMARY OF THE INVENTION

An object of the present invention is to provide an automotive rotary electric machine enabling magnetic flux generated in a rotor core by passage of electric current to a field winding to be utilized effectively, and also enabling additional magnetic flux from permanent magnets to be used efficiently by prescribing a circumferential side surface shape for the permanent magnets relative to a circumferential side surface shape of claw-shaped magnetic pole portions.

In order to achieve the above object, according to one aspect of the present invention, there is provided an automotive rotary electric machine including a rotor having a rotor core having a cylindrical boss portion; a first yoke portion disposed so as to extend radially outward from a first axial end of the boss portion; a second yoke portion disposed so as to extend radially outward from a second axial end of the boss portion; a plurality of first claw-shaped magnetic pole portions each disposed so as to extend toward the second axial end from the first yoke portion, arranged at a predetermined pitch in a circumferential direction, and having a radially-outermost circumferential surface shape formed so as to have a trapezoidal shape constituted by a tip end circumferential short side, a base end portion circumferential long side, and two oblique sides; and a plurality of second claw-shaped magnetic pole portions each disposed so as to extend toward the first axial end from the second yoke portion, arranged at a predetermined pitch in a circumferential direction, having a radially-outermost circumferential surface shape formed so as to have a trapezoidal shape constituted by a tip end circumferential short side, a base end portion circumferential long side, and two oblique sides, and arranged so as to alternate with the first claw-shaped magnetic pole portions in a circumferential direction; and a field winding installed on the boss portion, the rotor being disposed so as to be rotatable around a shaft inserted through a central axial position of the boss portion. Also included are: a stator having: a cylindrical stator core; and a stator winding installed in the stator core, the stator core being disposed so as to surround the rotor core coaxially; and permanent magnets constituted by first and second permanent magnets disposed between each circumferentially-adjacent pair of the first and second claw-shaped magnetic pole portions so as to contact a circumferential side surface of the first and second claw-shaped magnetic pole portions. An axial length ($L_1$) of the stator core relative to an axial distance ($L_2$) between facing end surfaces of the first and second yoke portions is constructed so as to satisfy an expression $L_1 > L_2$.

Because the axial length ($L_1$) of the stator core relative to the axial distance ($L_2$) between facing end surfaces of the first and second yoke portions is constructed so as to satisfy the expression $L_1 > L_2$, magnetic flux generated in the rotor core flows through the stator core efficiently, enabling ineffective magnetic flux to be reduced. Furthermore, because the first and second permanent magnets are disposed so as to contact a circumferential side surface of the first and second claw-shaped magnetic pole portions, additional magnetic flux from the first and second permanent magnets also flows through the stator core without waste.

BRIEF DESCRIPTION OF THE DRAWINGS

FIG. 14(A) is a perspective view schematically showing a substantial part of an automotive rotary electric machine shown in FIG. 9 or 12. FIG. 14(B) is a perspective view schematically showing a substantial part of an automotive rotary electric machine shown in FIG. 10. FIG. 14(C) is a perspective view schematically showing a substantial part of an automotive rotary electric machine shown in FIG. 11.

DETAILED DESCRIPTION OF THE PREFERRED EMBODIMENTS

Embodiment 1

Figure 1:
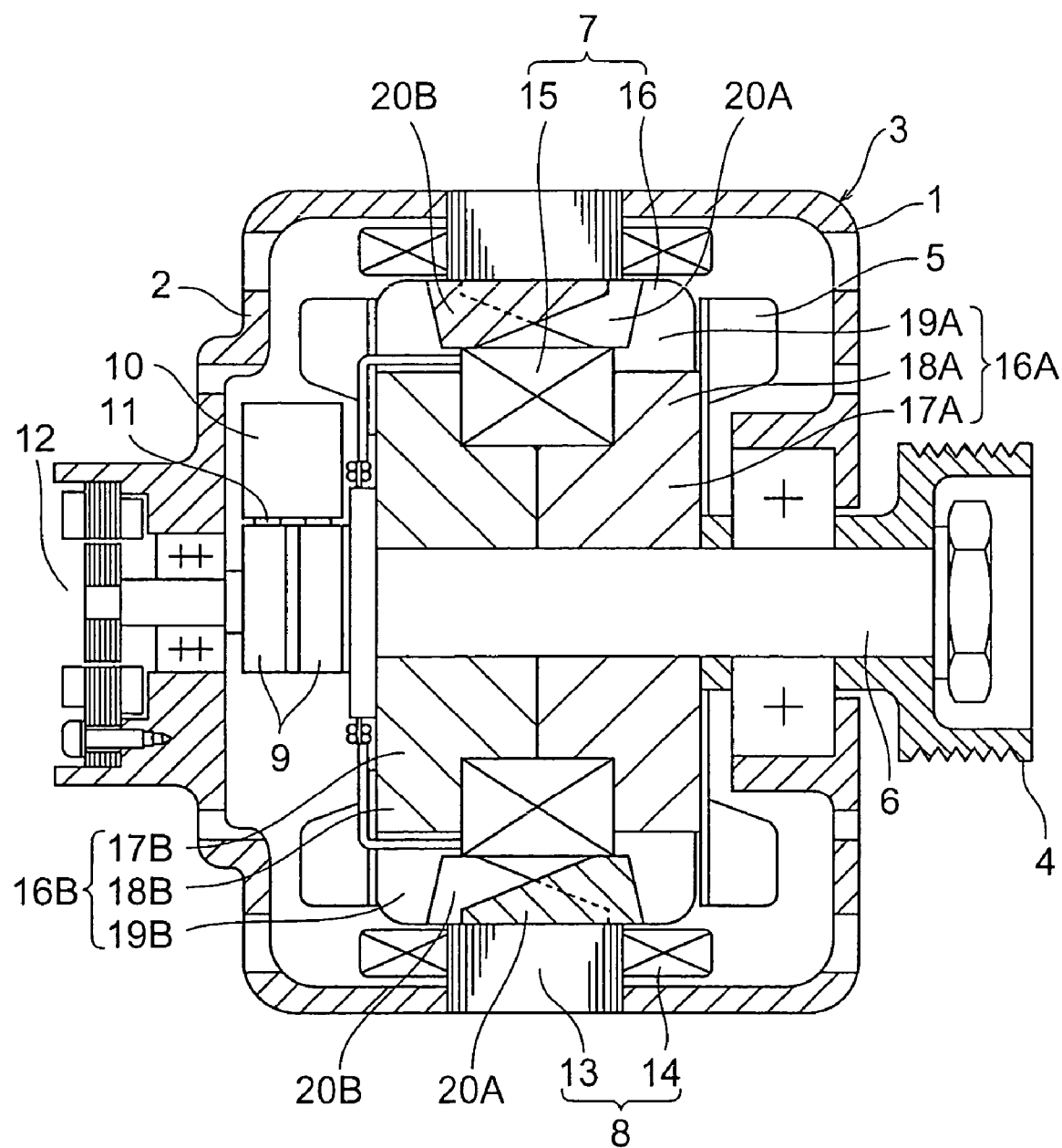
FIG. 1 is a longitudinal section showing an automotive rotary electric machine according to Embodiment 1 of the present invention.
Figure 2:
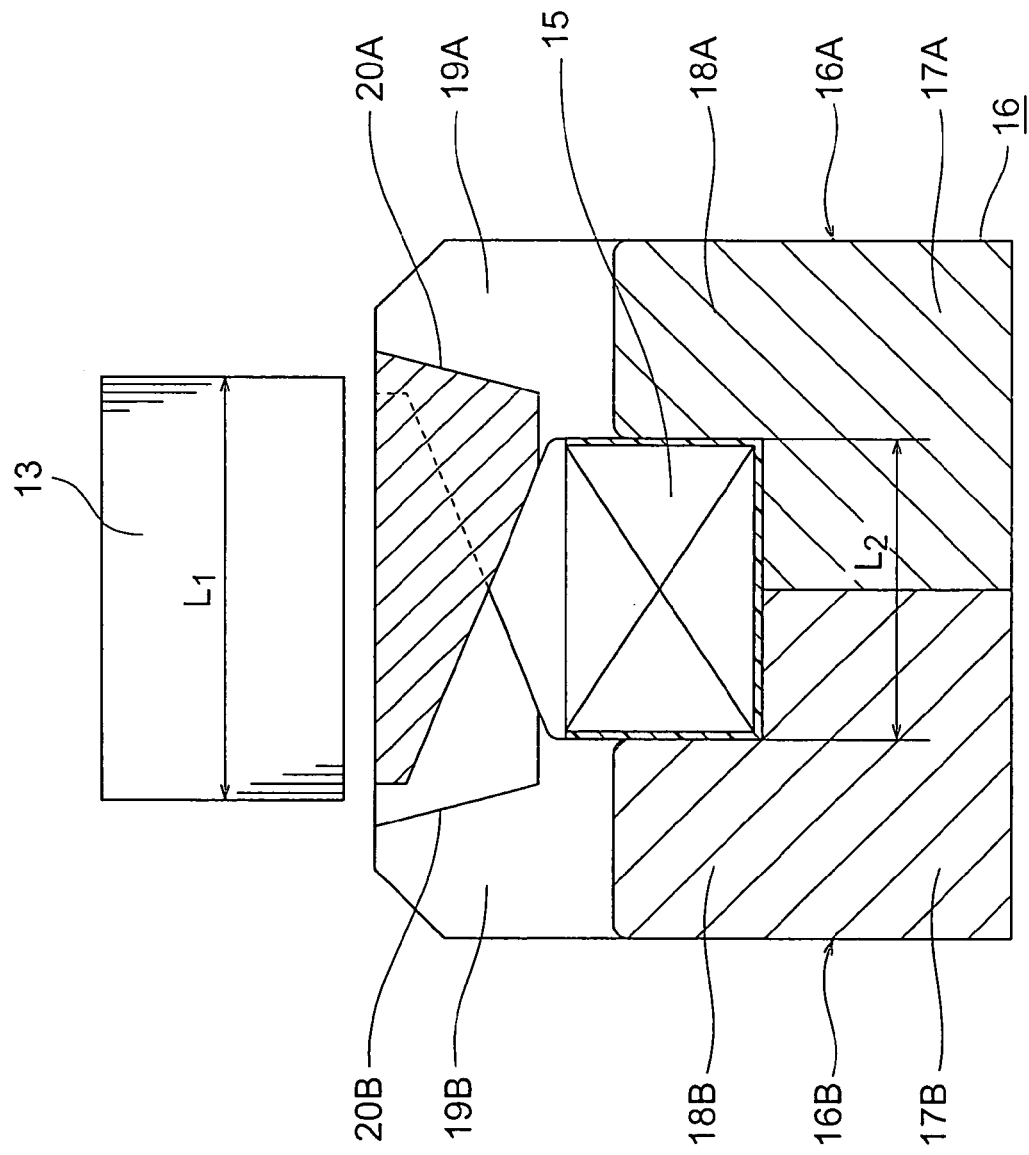
FIG. 2 is a cross section schematically showing a vicinity of claw-shaped magnetic pole portions of the automotive rotary electric machine shown in FIG. 1.

FIG. 1 is a longitudinal section showing an automotive rotary electric machine according to Embodiment 1 of the present invention, and FIG. 2 is a cross section schematically showing a vicinity of claw-shaped magnetic pole portions of the automotive rotary electric machine shown in FIG. 1.

In FIG. 1, an automotive rotary electric machine 1 includes: a case 3 constituted by a front bracket 1 and a rear bracket 2 made of aluminum; a shaft 6 rotatably supported by the case 3; a pulley 4 fixed to a first end portion of the shaft 6 projecting out through the case 3; a Lundell-type rotor 7 secured to the shaft 6 and disposed inside the case 3; a stator 8 secured to the case 3 so as to surround the rotor 7; slip rings 9 secured near a second end of the shaft 6, for supplying an electric current to the rotor 7; a pair of brushes 11 housed inside a brush holder 10, sliding on surfaces of the slip rings 9; and a rotational position sensor 12 mounted to a second end portion of the shaft 6 projecting out through the case 3, for detecting a rotational position of the rotor 7.

The rotor 7 includes: a field winding 15 for generating a magnetic flux on passage of an electric current; and a rotor core 16 constituted by first and second magnetic pole cores 16A and 16B made of iron disposed so as to cover the field winding 15, magnetic poles being formed in the first and second pole magnetic cores 16A and 16B by the magnetic flux from the field winding 15. The first magnetic pole core 16A includes: a cylindrical first boss portion 17A; a first yoke portion 18A disposed so as to extend radially outward from a first axial end of the first boss portion 17A; and first claw-shaped magnetic pole portions 19A each disposed so as to extend toward a second axial end from the first yoke portion 18A. The second magnetic pole core 16B includes: a cylindrical second boss portion 17B; a second yoke portion 18B disposed so as to extend radially outward from a second axial end of the second boss portion 17B; and second claw-shaped magnetic pole portions 19B each disposed so as to extend toward a first axial end from the second yoke portion 18B. Eight first claw-shaped magnetic pole portions 19A and eight second claw-shaped magnetic pole portions 19B, for example, are each arranged at a predetermined pitch in a circumferential direction. In addition, each of the first and second claw-shaped magnetic pole portions 19A and 19B are formed such that radially-outermost circumferential surfaces thereof form a trapezoidal shape constituted by a tip end circumferential short side, a base end portion circumferential long side, and two oblique sides, and circumferential side surfaces thereof are each formed so as to have a tapered shape constituted by a tip end radial short side, an oblique side constituting the outermost circumferential surface, and an oblique side joining a lower end of the tip end radial short side and an inner circumferential root portion of the first and second claw-shaped magnetic pole portions 19A and 19B. The first and second magnetic pole cores 16A and 16B are integrated by abutting a second end surface of the first boss portion 17A and a first end surface of the second boss portion 17B, disposing the first and second claw-shaped magnetic pole portions 19A and 19B so as to intermesh with each other, and pressing the shaft 6 through a central axial position of the first and second boss portions 17A and 17B. Moreover, the field winding 15 is wound onto the first and second boss portions 17A and 17B, and is covered by the first and second claw-shaped magnetic pole portions 19A and 19B.

The stator 8 includes: an annular stator core 13 prepared by laminating magnetic steel sheets; and a stator winding 14 installed in the stator core 13, is disposed coaxially with the rotor 7 so as to form a uniform air gap between radially-outermost circumferential surfaces of the first and second claw-shaped magnetic pole portions 19A and 19B and an inner peripheral surface of the stator core 13, and is held between the front bracket 1 and the rear bracket 2.

Permanent magnets constituted by first and second permanent magnets 20A and 20B are disposed between each of the first and second claw-shaped magnetic pole portions 19A and 19B. Between each of the first and second claw-shaped magnetic pole portions 19A and 19B, the first permanent magnets 20A are disposed so as to contact the circumferential side surfaces of the first claw-shaped magnetic pole portions 19A, and the second permanent magnets 20B are disposed so as to contact the circumferential side surfaces of the second claw-shaped magnetic pole portions 19B. Furthermore, the first and second permanent magnets 20A and 20B are prepared in a bulk body having a cross-sectional shape equivalent to the side surface shape contacting the first and second claw-shaped magnetic pole portions 19A and 19B, and are each disposed so as to be positioned inside the circumferential side surface shape of the contacting first and second claw-shaped magnetic pole portions 19A and 19B when viewed from a circumferential direction. In addition, the first and second permanent magnets 20A and 20B are each magnetized so as to reduce magnetic flux leakage among the first and second claw-shaped magnetic pole portions 19A and 19B. In other words, the first and second permanent magnets 20A and 20B are each magnetized so as to match the polarity arising in the circumferentially-contacting first and second claw-shaped magnetic pole portions 19A and 19B.

Here, as shown in FIG. 2, an axial length $L_1$ of the stator core 13 relative to a distance $L_2$ between facing end surfaces of the first and second yoke portions 18A and 18B of the rotor core 16 is constructed such that $L_1 > L_2$.

Next, effects according to Embodiment 1 will be explained with reference to FIGS. 3 and 4.

Figure 3:
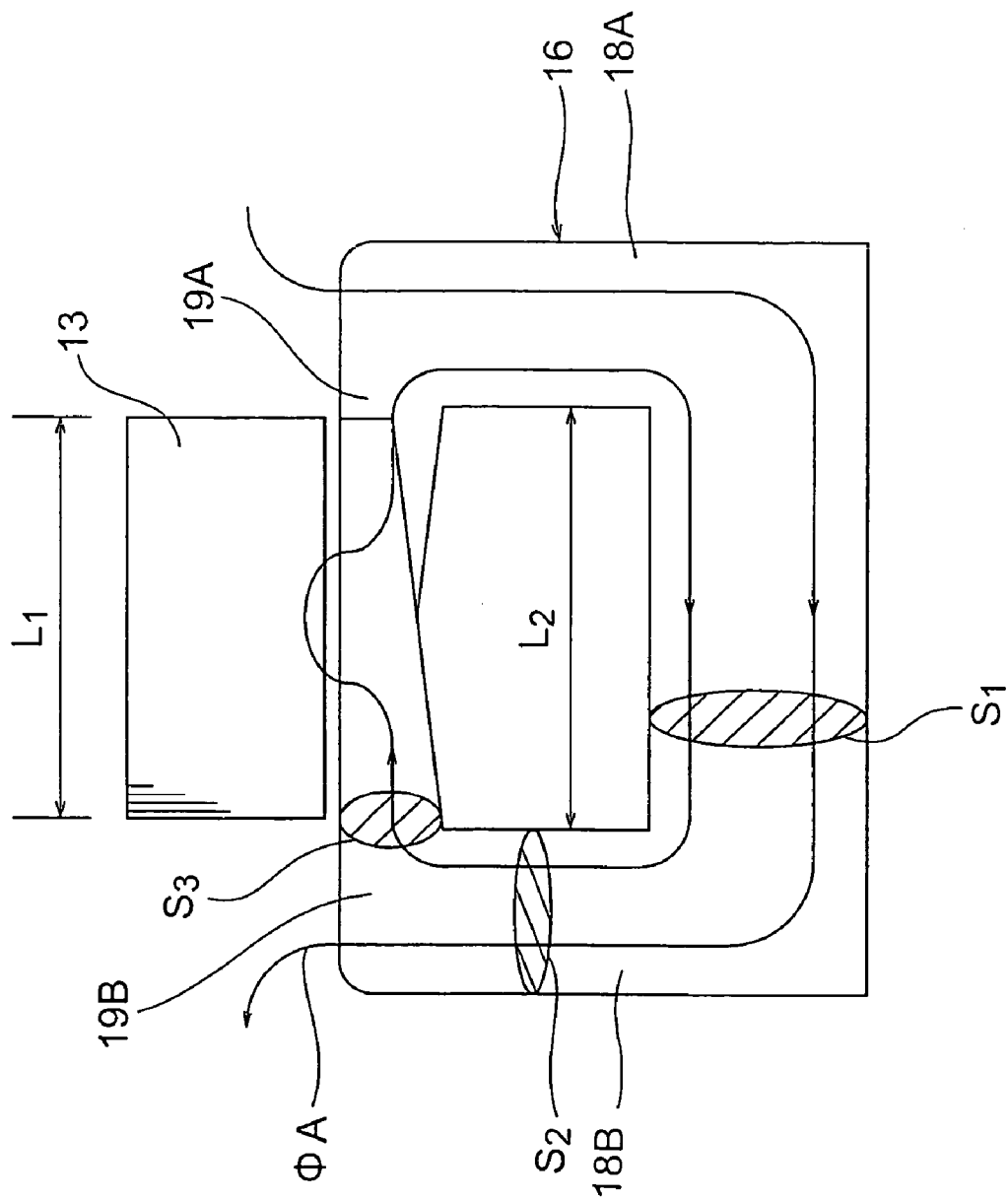
FIG. 3 is a cross section schematically showing a state of a magnetic flux arising due to a field current flowing through a field winding in a conventional automotive rotary electric machine.

FIG. 3 is a schematic diagram showing a state of a magnetic flux arising due to a field current flowing through a field winding in a conventional automotive rotary electric machine. In FIG. 3, if the axial length $L_1$ of the stator core 13 relative to the distance $L_2$ between the facing end surfaces of the first and second yoke portions 18A and 18B of the rotor core 16 satisfies $L_1 \leq L_2$, and magnetic path cross-sectional areas $S_1$, $S_2$, and $S_3$ of the boss portion, the yoke portions, and the root portion of the claw-shaped magnetic pole portions, respectively, in the rotor core 16 are designed so as to all be equal ($S_1=S_2=S_3$), the occurrence of ineffective magnetic flux $\phi A$ not passing through the stator core 13 can be suppressed to a minimum. However, when the magnetic path cross-sectional areas $S_1$, $S_2$, and $S_3$ of each portion of the rotor core 16 are designed such that $S_1=S_2>S_3$, the magnetic flux is saturated in the root portions of the claw-shaped magnetic pole portions. As a result, ineffective magnetic flux $\phi A$ that does not pass through the stator core 13 arises, which is inefficient.

Figure 4:
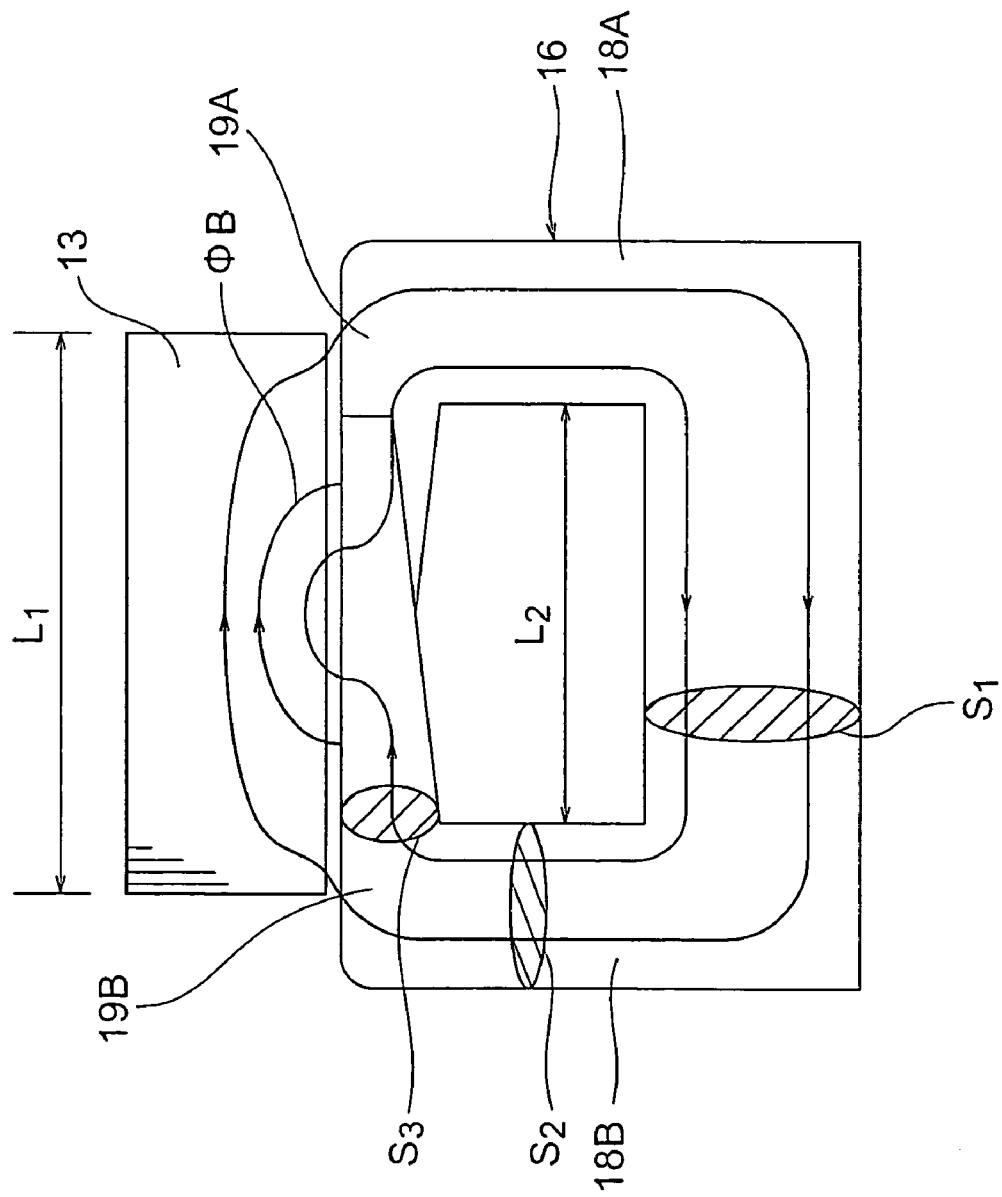
FIG. 4 is a cross section schematically showing a state of a magnetic flux arising due to a field current flowing through a field winding in the automotive rotary electric machine according to Embodiment 1 of the present invention.

FIG. 4 is a schematic diagram showing a state of a magnetic flux arising due to a field current flowing through a field winding in the automotive rotary electric machine according to Embodiment 1 of the present invention. In FIG. 4, the axial length $L_1$ of the stator core 13 is formed so as to be greater than the distance $L_2$ between the facing end surfaces of the first and second yoke portions 18A and 18B of the rotor core 16. Thus, the magnetic path cross-sectional areas $S_1$, $S_2$, and $S_3$ of each portion in the rotor core 16 are designed such that $S_1=S_2>S_3$, and even if the magnetic flux is saturated in the root portion of the claw-shaped magnetic pole portions, the magnetic flux that was ineffective magnetic flux $\phi A$ in FIG. 3 is added to the stator core 13 as effective magnetic flux. As a result, magnetic flux generated in the rotor core 16 is utilized effectively. Furthermore, an additional magnetic flux portion $\phi B$ from the first and second permanent magnets 20A and 20B disposed so as to contact the first and second claw-shaped magnetic pole portions 19A and 19B flows through the stator core 13 without waste.

Thus, according to Embodiment 1, because the axial length $L_1$ of the stator core 13 relative to the distance $L_2$ between the facing end surfaces of the first and second yoke portions 18A and 18B of the rotor core 16 is formed so as to satisfy the expression $L_1 > L_2$, magnetic flux generated in the rotor core 16 flows through the stator core 13 efficiently, enabling ineffective magnetic flux $\phi A$ to be reduced. Furthermore, because the first and second permanent magnets 20A and 20B are disposed so as to contact the circumferential side surfaces of the first and second claw-shaped magnetic pole portions 19A and 19B, the additional magnetic flux portion $\phi B$ from the first and second permanent magnets 20A and 20B also flows through the stator core 13 without waste.

Because the first and second permanent magnets 20A and 20B are disposed so as to be positioned inside the circumferential side surface shape of the contacting first and second claw-shaped magnetic pole portions 19A and 19B when viewed from a circumferential direction, entire circumferential side surfaces of the first and second permanent magnets 20A and 20B come into contact with the circumferential side surfaces of the first and second claw-shaped magnetic pole portions 19A and 19B, efficiently utilizing the additional magnetic flux from the permanent magnets.

Embodiment 2

Figure 5:
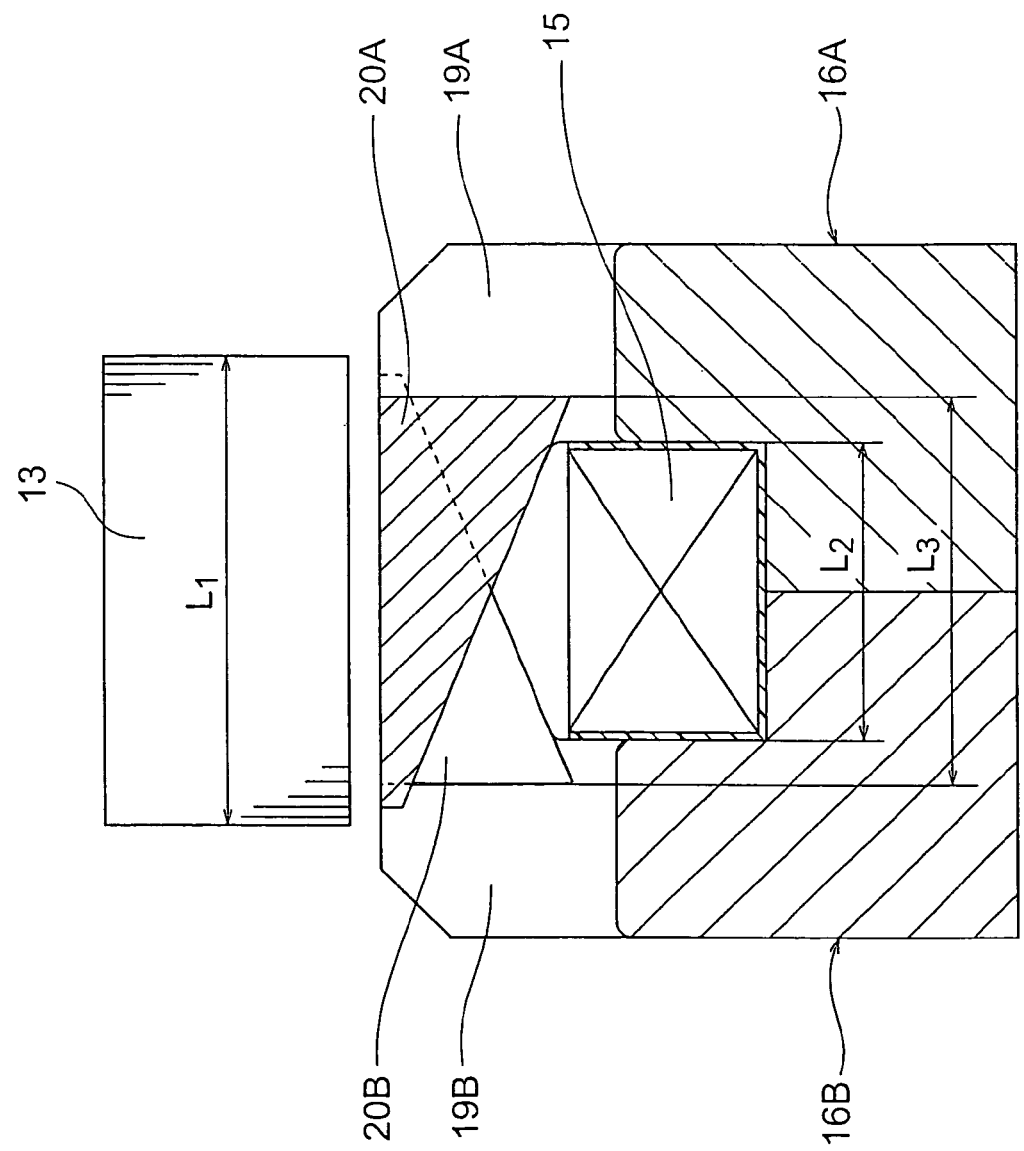
FIG. 5 is a cross section schematically showing a vicinity of claw-shaped magnetic pole portions of an automotive rotary electric machine according to Embodiment 2 of the present invention.

FIG. 5 is a cross section schematically showing a vicinity of claw-shaped magnetic pole portions of an automotive rotary electric machine according to Embodiment 2 of the present invention.

In FIG. 5, first and second permanent magnets 20A and 20B are prepared so as to have a side surface shape (a cross-sectional shape) matching a circumferential side surface of first and second claw-shaped magnetic pole portions 19A and 19B, the side surface shape having a tapered shape constituted by a tip end radial short side, an oblique side constituting the outermost circumferential surface, and an oblique side joining a lower end of the tip end radial short side and an inner circumferential root portion of the first and second claw-shaped magnetic pole portions 19A and 19B. Base end portions of the first and second permanent magnets 20A and 20B are positioned axially inside axial end surfaces of a stator core 13. Here, an axial length $L_3$ of the permanent magnets being the distance between the axial end surfaces of the base end portions of the first and second permanent magnets 20A and 20B satisfies $L_1 > L_3 > L_2$.

Moreover, the rest of this embodiment is constructed in a similar manner to Embodiment 1 above.

Figure 6A:
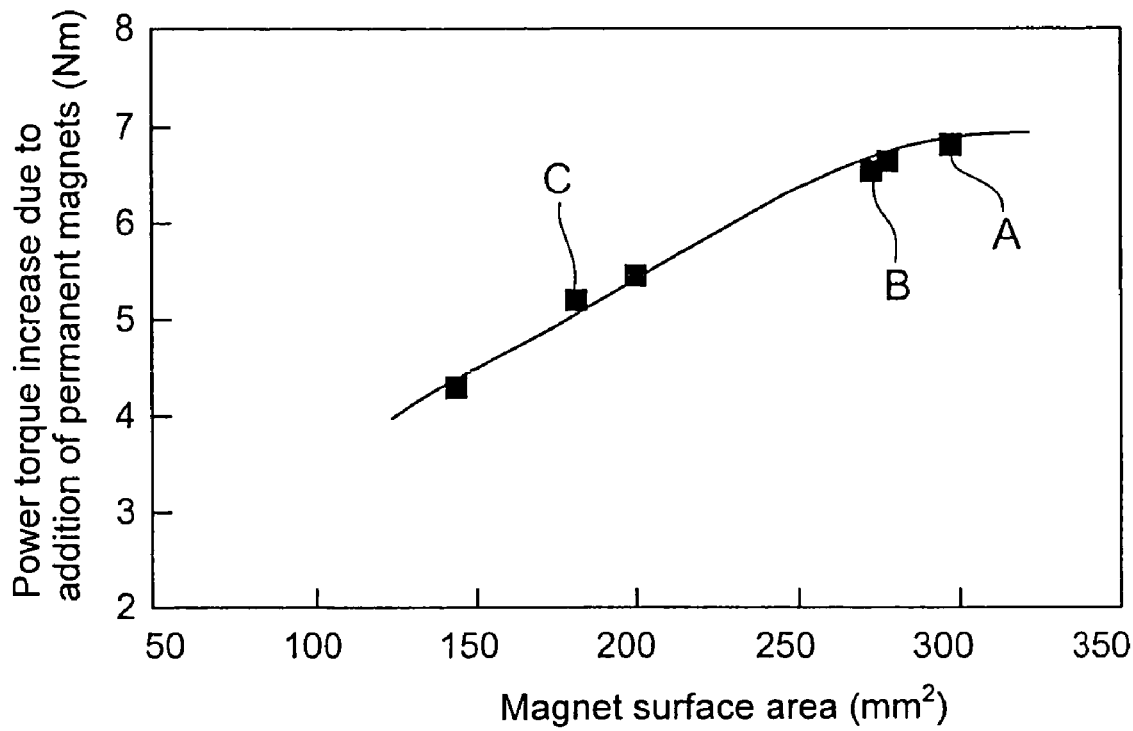
FIGS. 6A and 6B are graphs showing measured results of power torque increase and zero field current no-load induced voltage when a cross-sectional area of permanent magnets was varied in a sixteen-pole Lundell-type rotary electric machine operated under a 12-volt voltage.
Figure 6B:
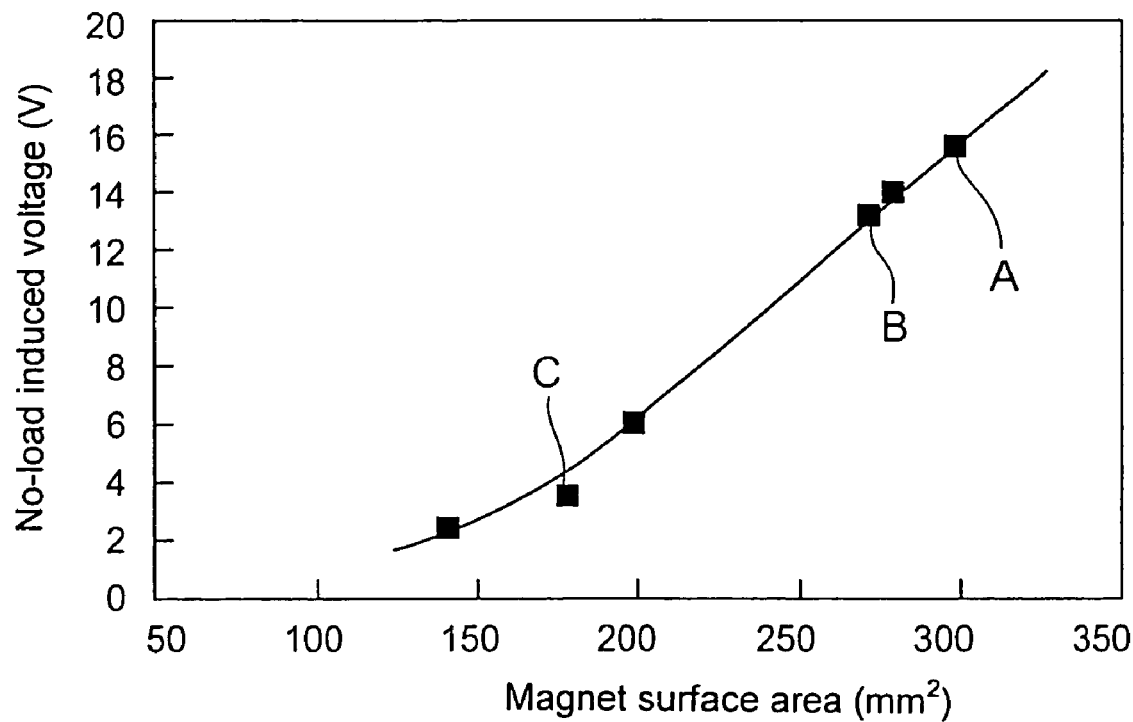
Figure 7:
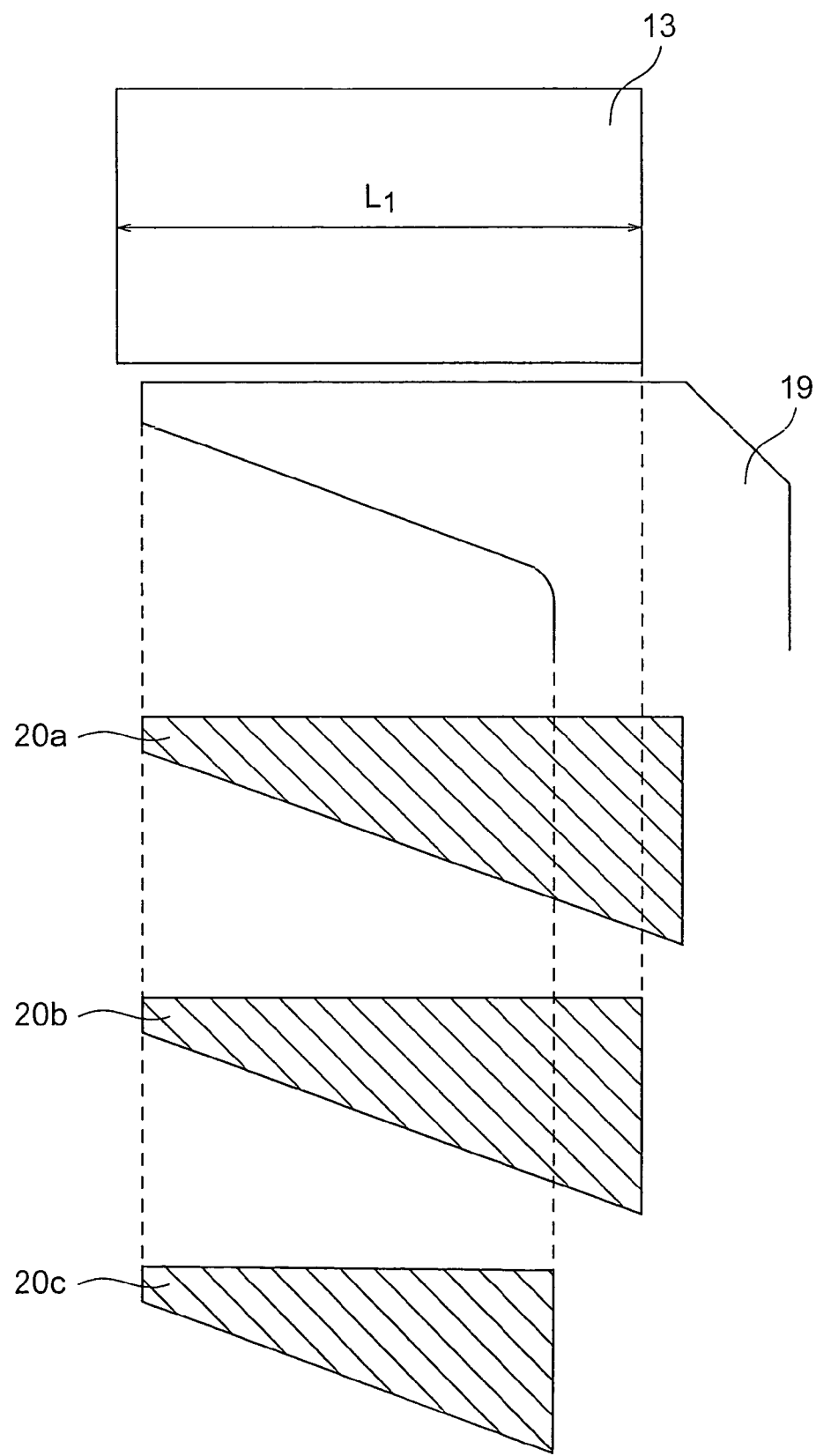
FIG. 7 is a diagram explaining relationships between cross-sectional area and axial length of the permanent magnets.

Next, measured results of power torque increase and zero field current no-load induced voltage when a cross-sectional area of permanent magnets was varied in a sixteen-pole Lundell-type rotary electric machine operated under a 12-volt voltage are shown in FIGS. 6A and 6B. Moreover, FIG. 6A shows a relationship between the cross-sectional area of the permanent magnets and power torque increase, and FIG. 6B shows a relationship between the cross-sectional area of the permanent magnets and zero field current no-load induced voltage. FIG. 7 is a graph explaining a relationship between the cross-sectional area of the permanent magnets and axial length ($L_3$).

Here, as shown in FIG. 7, the surface area of permanent magnets 20 contacting the circumferential side surfaces of the claw-shaped magnetic pole portions 19, in other words, the cross-sectional area in a plane that is parallel to the circumferential side surfaces of the claw-shaped magnetic pole portions 19 is changed by changing the axial length $L_3$. A permanent magnet 20a is a magnet corresponding to point A in FIG. 6, and has a base end portion positioned axially outside the stator core 13 ($L_3 > L_1$). A permanent magnet 20b is a magnet corresponding to point B in FIG. 6, and has a base end portion aligned with the axial end surface of the stator core 13 ($L_3 = L_1$). A permanent magnet 20c is a magnet corresponding to point C in FIG. 6, and has a base end portion aligned with an inner circumferential root portion of the claw-shaped magnetic poles 19 ($L_3=L_2$).

From FIG. 6A, it can be seen that increase in power torque increases in proportion to increase in magnet surface area, but when the magnet surface area exceeds 270 mm² (point B), the rate of increase in the increase in power torque decreases. In a region where the magnet surface area exceeds 270 mm², effects of increasing increases in power torque by increasing magnet surface area are reduced. In other words, the amount of increase in power torque per unit magnet in the permanent magnets is reduced.

From FIG. 6B, the zero field current no-load induced voltage increases in proportion to increase in magnet surface area in a region in which the magnet surface area is greater than 180 mm² (point C), and exceeds the 12 V constituting the power supply system voltage when the magnet surface area exceeds 270 mm² (point B). Then, in a region in which the magnet surface area is less than 180 mm² (point C), effects of increasing the zero field current no-load induced voltage by increasing the magnet surface area are reduced. In other words, the amount of increase in the zero field current no-load induced voltage per unit magnet in the permanent magnets is reduced.

From this, it is desirable for the cross-sectional area of the first and second permanent magnets 20A and 20B to be set so as to be greater than 180 mm² and less than or equal to 270 mm² from the viewpoints of power torque and zero field current no-load induced voltage. In other words, it is desirable for the axial length $L_3$ of the permanent magnets to be less than or equal to $L_1$ and greater than $L_2$ ($L_1 \geq L_3 > L_2$).

In Embodiment 2, because the axial length $L_3$ of the permanent magnets satisfies $L_1 > L_3 > L_2$, the zero field current no-load induced voltage can be kept within the power supply system voltage, and the amount of increase in the power torque and the zero field current no-load induced voltage per unit magnet is large, making the arrangement of the permanent magnets effective.

Embodiment 3

Figure 8:
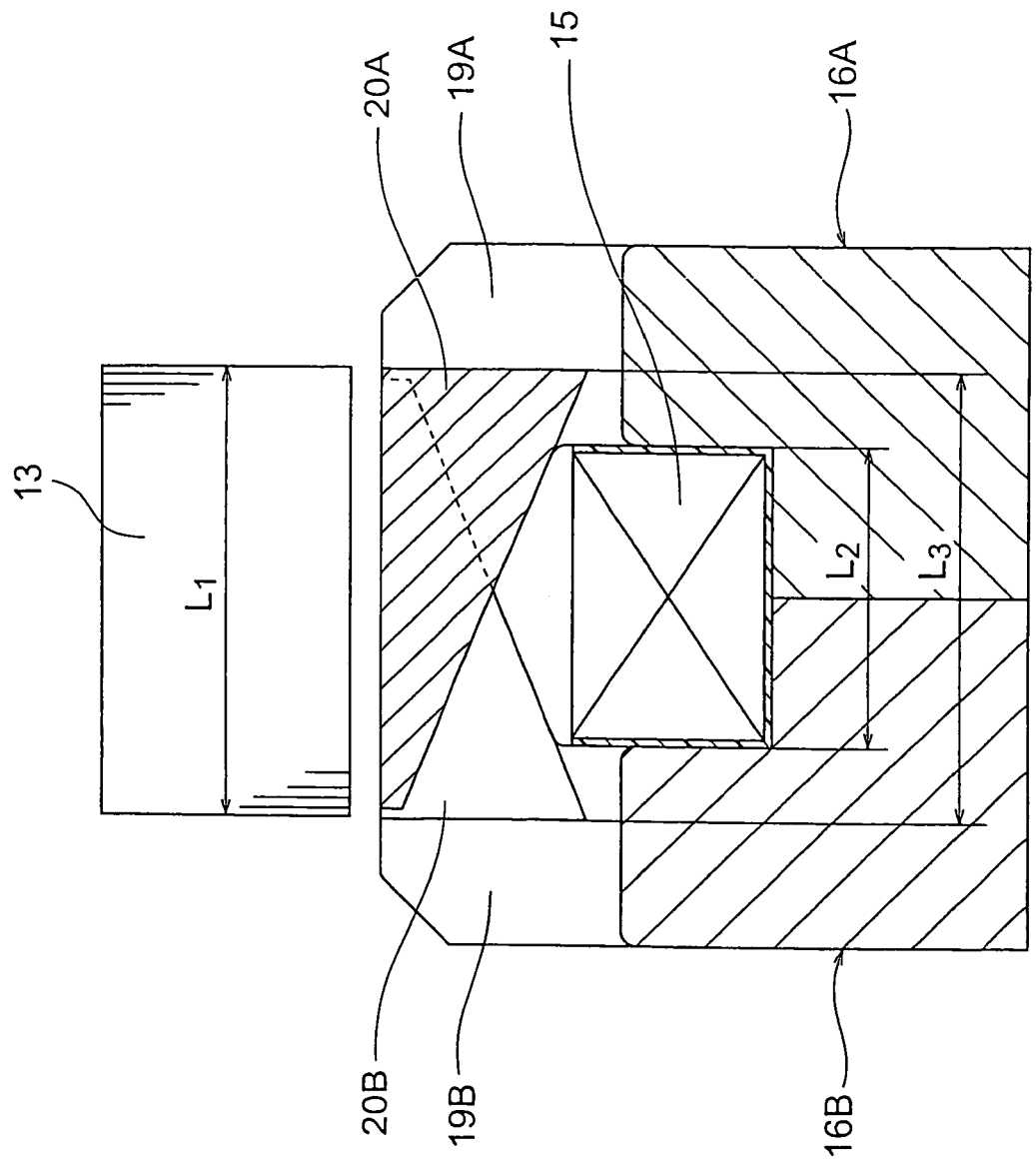
FIG. 8 is a cross section schematically showing a vicinity of claw-shaped magnetic pole portions of an automotive rotary electric machine according to Embodiment 3 of the present invention.

FIG. 8 is a cross section schematically showing a vicinity of claw-shaped magnetic pole portions of an automotive rotary electric machine according to Embodiment 3 of the present invention.

In FIG. 8, first and second permanent magnets 20A and 20B are prepared so as to have a side surface shape (a cross-sectional shape) matching a circumferential side surface of first and second claw-shaped magnetic pole portions 19A and 19B, the side surface shape having a tapered shape constituted by a tip end radial short side, an oblique side constituting the outermost circumferential surface, and an oblique side joining a lower end of the tip end radial short side and an inner circumferential root portion of the first and second claw-shaped magnetic pole portions 19A and 19B. Positions of base end portions of the first and second permanent magnets 20A and 20B align with positions of first and second axial ends of a stator core 13 relative to an axial direction. In other words, an axial length $L_3$ of the permanent magnets relative to an axial length $L_1$ of the stator core 13 satisfies $L_3=L_1$.

Moreover, the rest of this embodiment is constructed in a similar manner to Embodiment 2 above.

According to Embodiment 3, the axial length $L_3$ of the permanent magnets is prepared so as to be equal to the axial length $L_1$ of the stator core 13. Thus, in a similar manner to Embodiment 2 above, the zero field current no-load induced voltage can be kept within the power supply system voltage, and the amount of increase in the power torque and the zero field current no-load induced voltage per unit magnet is large, making the arrangement of the permanent magnets effective.

Additional magnetic flux from the first and second permanent magnets 20A and 20B also flows through the stator core 13 without magnetic flux leakage. Thus, because the additional magnetic flux from the first and second permanent magnets 20A and 20B is utilized maximally, the arrangement of the permanent magnets is effective.

Embodiment 4

Figure 9:
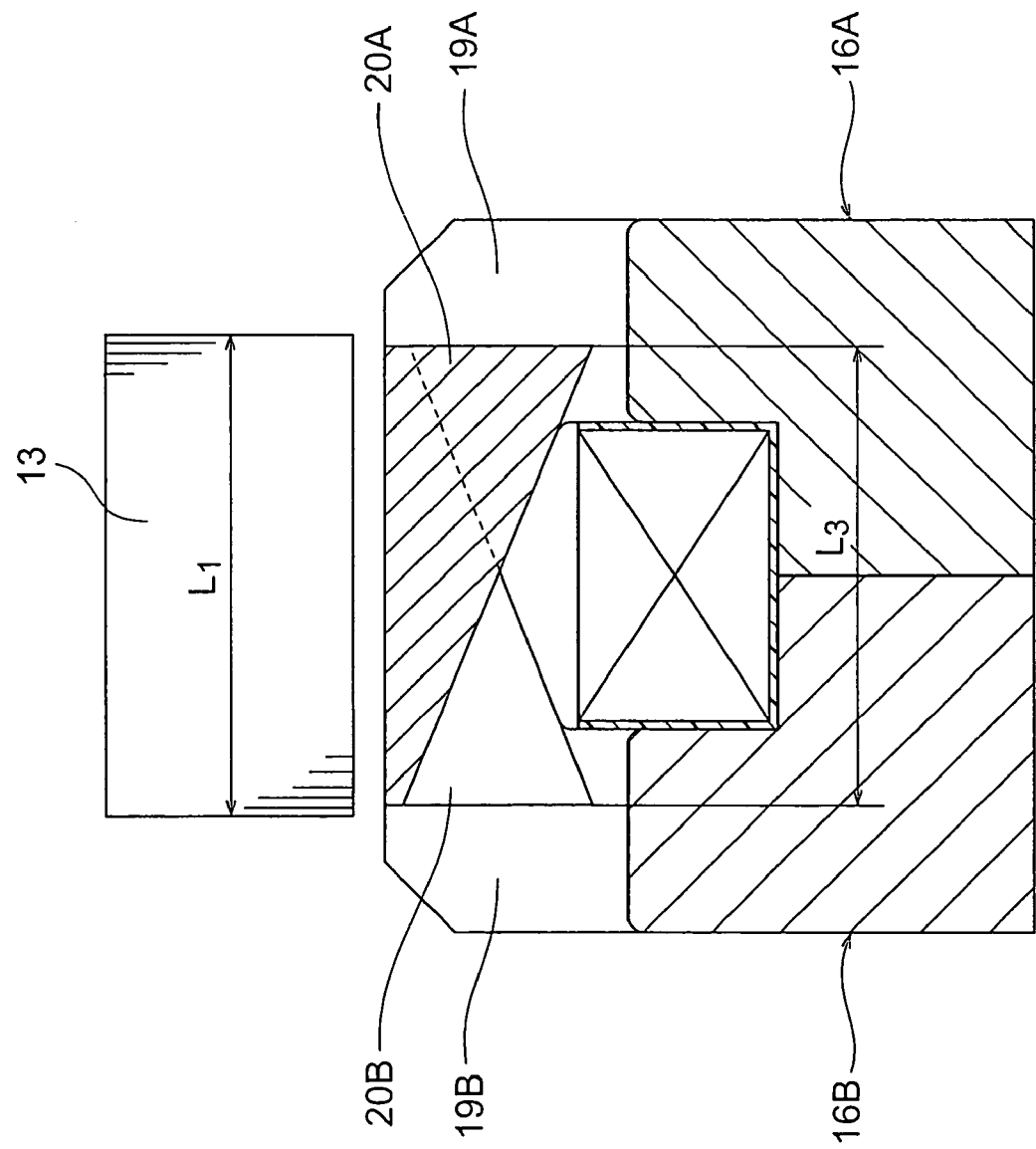
FIG. 9 is a cross section schematically showing a vicinity of claw-shaped magnetic pole portions of an automotive rotary electric machine according to Embodiment 4 of the present invention.

FIG. 9 is a cross section schematically showing a vicinity of claw-shaped magnetic pole portions of an automotive rotary electric machine according to Embodiment 4 of the present invention.

In FIG. 9, first and second permanent magnets 20A and 20B are prepared so as to have a side surface shape (a cross-sectional shape) matching a circumferential side surface of first and second claw-shaped magnetic pole portions 19A and 19B, the side surface shape having a tapered shape constituted by a tip end radial short side, an oblique side constituting the outermost circumferential surface, and an oblique side joining a lower end of the tip end radial short side and an inner circumferential root portion of the first and second claw-shaped magnetic pole portions 19A and 19B. Positions of axial end surfaces of base end portions and tip portions of the first permanent magnets 20A align with positions of axial end surfaces of tip portions and base end portions of the second permanent magnets 20B relative to an axial direction. In addition, base end portions of the first and second permanent magnets 20A and 20B are positioned axially inside axial end surfaces of a stator core 13.

Moreover, the rest of this embodiment is constructed in a similar manner to Embodiment 2 above.

In Embodiment 4, because the axial length $L_3$ of the permanent magnets also satisfies $L_1 \geq L_3 > L_2$, in a similar manner to Embodiment 2 above, the zero field current no-load induced voltage can be kept within the power supply system voltage, and the amount of increase in the power torque and the zero field current no-load induced voltage per unit magnet is large, making the arrangement of the permanent magnets effective.

Because axial positions of the axial end surfaces of the base end portions and the tip portions of the first permanent magnets 20A align with the axial positions of the axial end surfaces of the tip portions and the base end portions of the second permanent magnets 20B, and the tip portions of the first and second permanent magnets 20A and 20B align with the tip portions of the first and second claw-shaped magnetic pole portions 19A and 19B, magnetic flux leakage between the first and second claw-shaped magnetic pole portions 19A and 19B can be reliably reduced.

Embodiment 5

Figure 10:
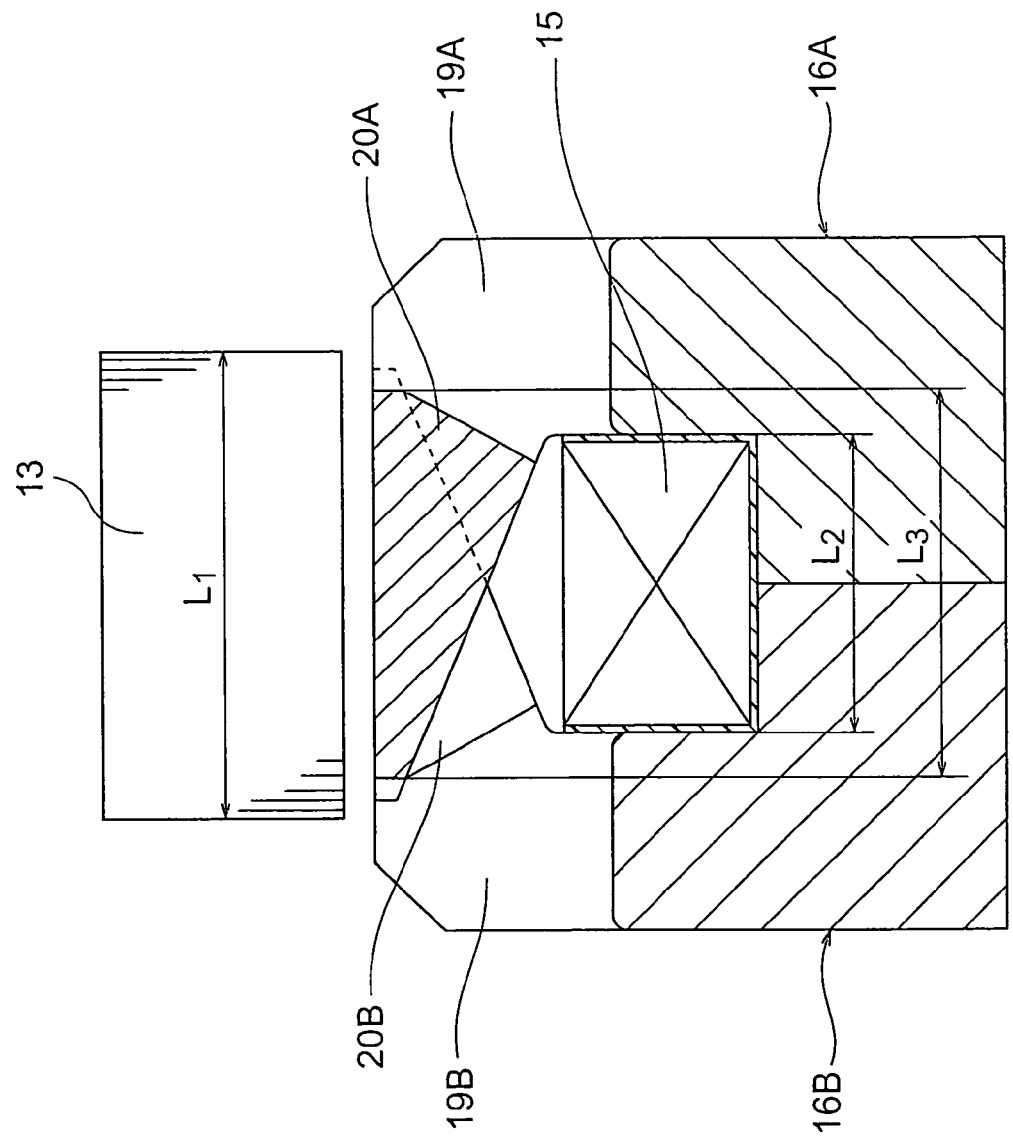
FIG. 10 is a cross section schematically showing a vicinity of claw-shaped magnetic pole portions of an automotive rotary electric machine according to Embodiment 5 of the present invention.

FIG. 10 is a cross section schematically showing a vicinity of claw-shaped magnetic pole portions of an automotive rotary electric machine according to Embodiment 5 of the present invention.

In FIG. 10, first and second permanent magnets 20A and 20B are formed so as to have an inclined surface intersecting an axial end surface of a base end portion by cutting away and removing an inner radial side of the base end portion, and axial positions of axial end surfaces of tip portions are positioned near the base end portions relative to tip portions of the first and second claw-shaped magnetic pole portions 19A and 19B. In other words, the first and second permanent magnets 20A and 20B are prepared so as to have a side surface shape (a cross-sectional shape) generally aligned with a circumferential side surface of first and second claw-shaped magnetic pole portions 19A and 19B in a region excluding inner circumferential portions of the tip portions and base end portions of the first and second claw-shaped magnetic pole portions 19A and 19B, the side surface shape having a tapered shape constituted by a tip end radial short side, an oblique side constituting the outermost circumferential surface, and an oblique side joining a lower end of the tip end radial short side and an inner circumferential root portion of the first and second claw-shaped magnetic pole portions 19A and 19B. Axial positions of the axial end surfaces of the base end portions and tip portions of the first permanent magnets 20A align with axial positions of the axial end surfaces of tip portions and base end portions of the second permanent magnets 20B. In addition, the base end portions of the first and second permanent magnets 20A and 20B are positioned axially inside axial end surfaces of a stator core 13.

Moreover, the rest of this embodiment is constructed in a similar manner to Embodiment 2 above.

In Embodiment 5, radially-outer peripheral portions of the first and second permanent magnets 20A and 20B are in close proximity to the stator core 13, and additional magnetic flux from the permanent magnets in these portions flows through the stator core 13 becoming effective magnetic flux. However, the inner radial sides of the base end portions of the first and second permanent magnets 20A and 20B are distant from the stator core 13, and additional magnetic flux from the permanent magnets in these portions is less likely to flow through the stator core 13, making it unlikely to become effective magnetic flux.

In Embodiment 5, because portions of the permanent magnets that contribute little to the additional magnetic flux constituted by the inner radial sides of the base end portions of the first and second permanent magnets 20A and 20B are cut away, the magnet shape enables the magnetic flux of the permanent magnets to be used efficiently as effective magnetic flux, enabling reductions in the size of the permanent magnets while ensuring effective magnetic flux capable of being added.

In Embodiment 5, because the axial length $L_3$ of the permanent magnets also satisfies $L_1 \geq L_3 > L_2$, similar effects to those in Embodiment 2 above can also be achieved.

Embodiment 6

Figure 11:
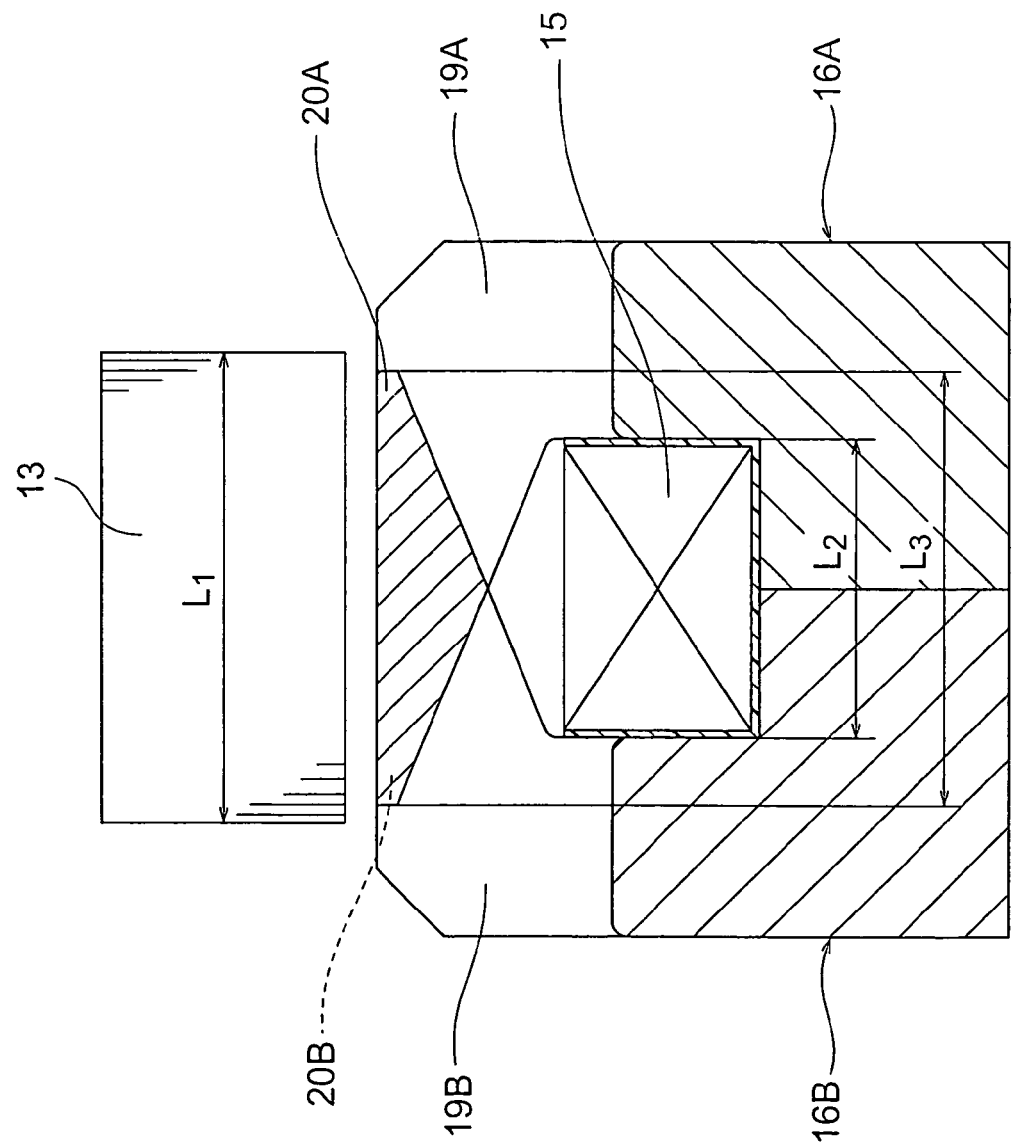
FIG. 11 is a cross section schematically showing a vicinity of claw-shaped magnetic pole portions of an automotive rotary electric machine according to Embodiment 6 of the present invention.

FIG. 11 is a cross section schematically showing a vicinity of claw-shaped magnetic pole portions of an automotive rotary electric machine according to Embodiment 6 of the present invention.

In FIG. 11, an amount of cutting away on an inner radial side of a base end portion of first and second permanent magnets 20A and 20B is greater than in Embodiment 5 above, being formed so as to have a side surface shape (a cross-sectional shape) matching a region of overlap (a superposed surface) when a circumferential side surface of a first claw-shaped magnetic pole portion 19A is projected onto a circumferential side surface of a facing second claw-shaped magnetic pole portion 19B. The base end portions of the first and second permanent magnets 20A and 20B are positioned axially inside axial end surfaces of a stator core 13.

Moreover, the rest of this embodiment is constructed in a similar manner to Embodiment 2 above.

According to Embodiment 6, because the first and second permanent magnets 20A and 20B are formed so as to have a cross-sectional shape generally matching a superposed surface in which facing circumferential side surfaces of the first and second claw-shaped magnetic pole portions 19A and 19B are superposed in a circumferential direction, magnetic flux leakage between the first and second claw-shaped magnetic pole portions 19A and 19B can be reliably reduced.

Because portions of the permanent magnets that contribute little to the additional magnetic flux constituted by the inner radial sides of the first and second permanent magnets 20A and 20B are cut away, the magnet shape enables the magnetic flux of the permanent magnets to be used efficiently as effective magnetic flux, enabling further reductions in the size of the permanent magnets while ensuring effective magnetic flux capable of being added.

In Embodiment 6, because the axial length $L_3$ of the permanent magnets also satisfies $L_1 \geq L_3 > L_2$, similar effects to those in Embodiment 2 above can also be achieved.

Embodiment 7

In Embodiments 1 to 6 above, the shape and arrangement of the permanent magnets disposed on the circumferential side surfaces of the claw-shaped magnetic pole portions are prescribed, but in Embodiment 7, a relationship of side surface surface area (cross-sectional surface area) of the permanent magnets relative to the circumferential side surface surface area of one side of the claw-shaped magnetic pole portions is prescribed.

Figure 12:
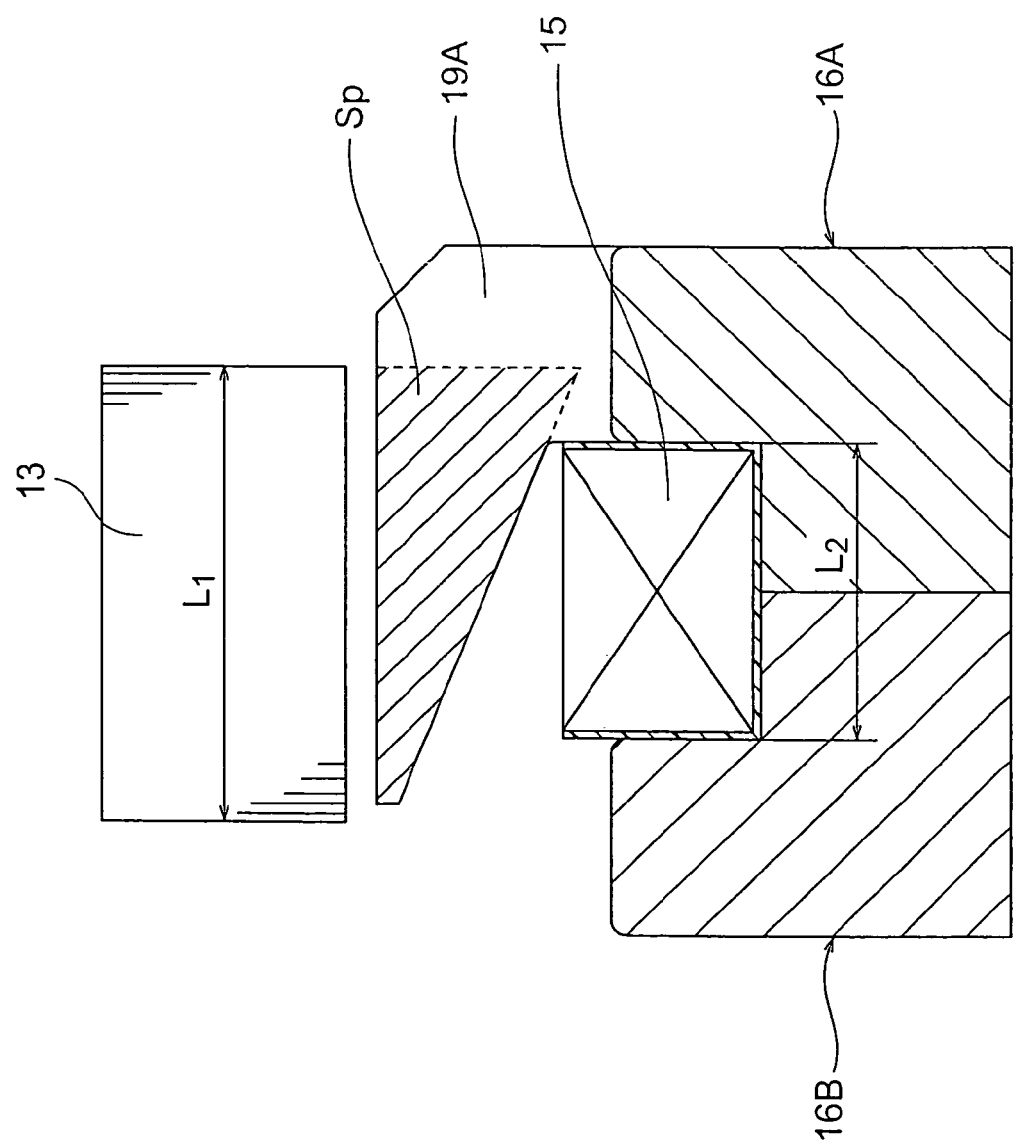
FIG. 12 is a cross section schematically showing a vicinity of claw-shaped magnetic pole portions of an automotive rotary electric machine according to Embodiment 7 of the present invention.
Figure 13:
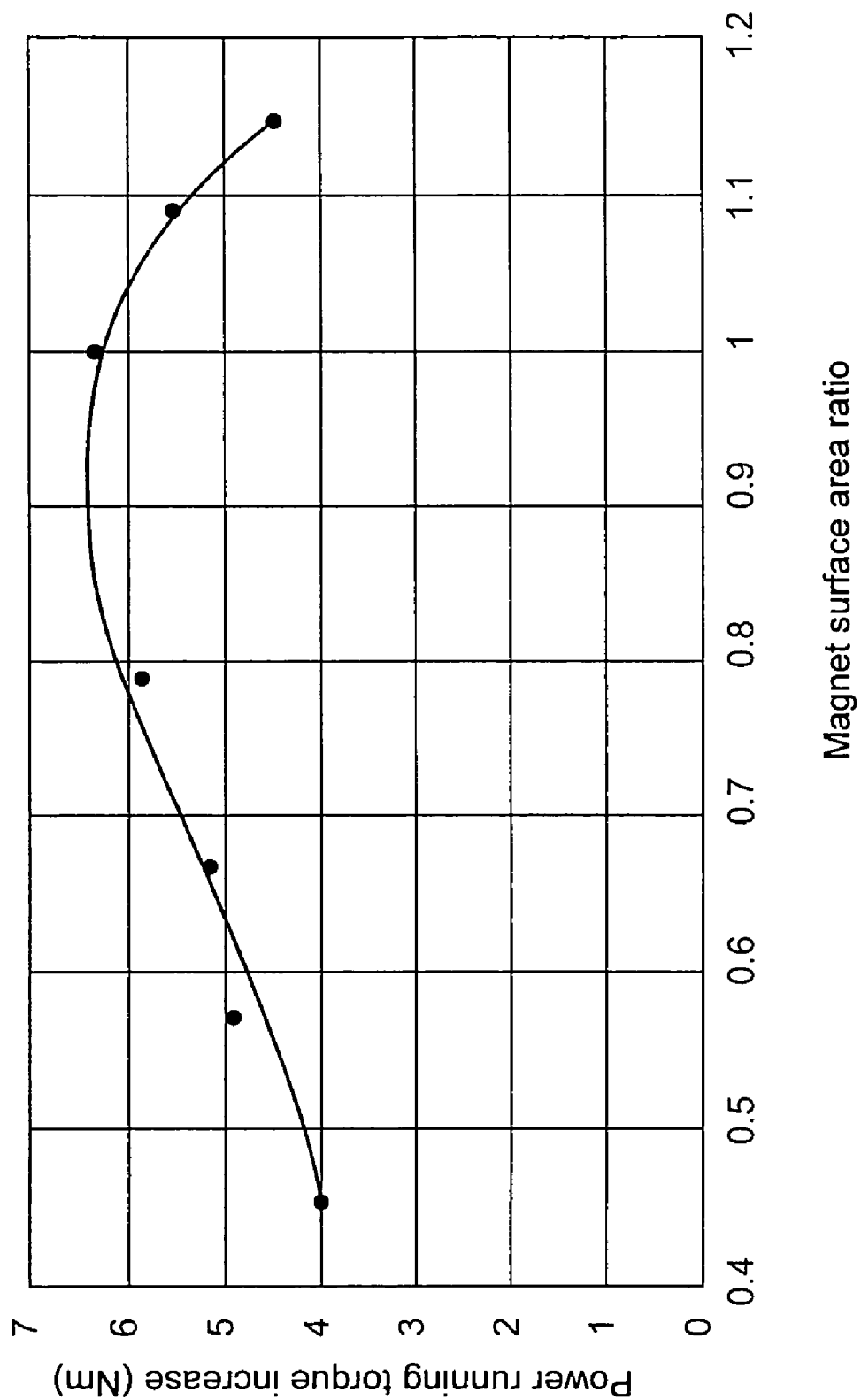
FIG. 13 is a graph representing a relationship between magnet surface area ratio and maximum torque increase during power running in the automotive rotary electric machine according to Embodiment 7 of the present invention.
Figure 14:
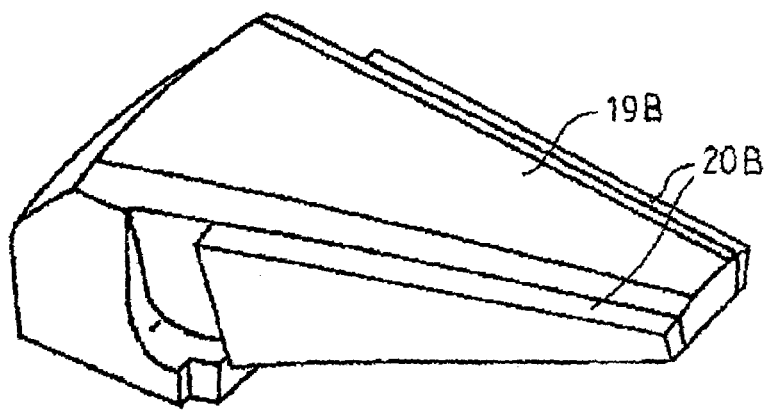
FIGS. 14(A)–(C) are perspective views of a part of an automotive rotary electric machine.
Figure 14:
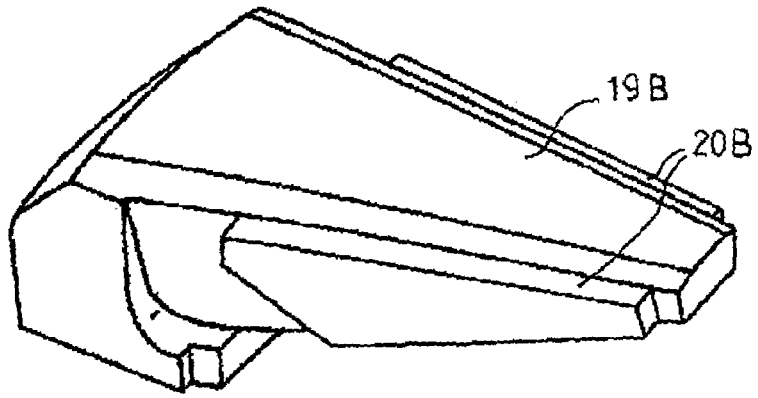
Figure 14:
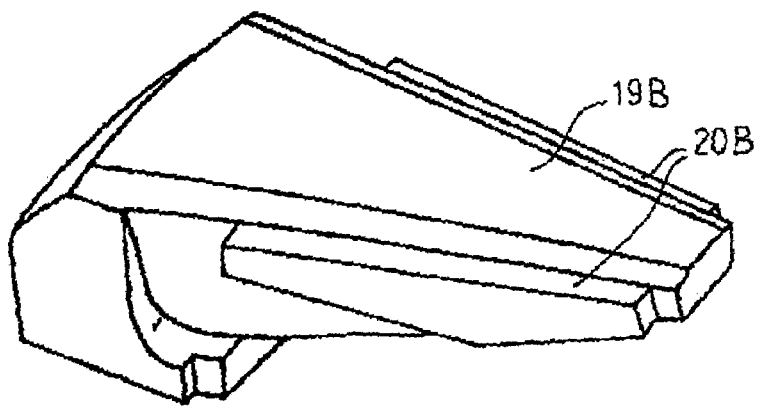

FIG. 12 is a cross section schematically showing a vicinity of claw-shaped magnetic pole portions of an automotive rotary electric machine according to Embodiment 7 of the present invention, and FIG. 13 is a graph representing a relationship between magnet surface area ratio and maximum torque increase during power running in the automotive rotary electric machine according to Embodiment 7 of the present invention.

Here, the magnet surface area ratio is a ratio (Sm/Sp) occupied by the side surface surface area (the cross-sectional area) Sm of the permanent magnets relative to the circumferential side surface surface area Sp of the claw-shaped magnetic pole portions. The circumferential side surface surface area Sp of one side of the claw-shaped magnetic pole portions, as indicated by oblique lines in FIG. 12, is the surface area of a region on a circumferential side surface of a first claw-shaped magnetic pole portion 19A bounded by a tip end radial short side, an oblique side constituting an outermost circumferential surface, an oblique side joining a lower end of the tip end radial short side and an inner circumferential root portion of the first claw-shaped magnetic pole portion 19A, and a straight radial line aligned with an axial end surface of the stator core 13. On the other hand, the side surface surface area Sm of the permanent magnets is the surface area of a first permanent magnet 20A contacting the circumferential side surface of the first claw-shaped magnetic pole portion 19A. The first permanent magnets 20A have a side surface shape matching a circumferential side surface of the first claw-shaped magnetic pole portions 19A, the side surface shape being constituted by a tip end radial short side, an oblique side constituting the outermost circumferential surface, and an oblique side joining a lower end of the tip end radial short side and an inner circumferential root portion of the first claw-shaped magnetic pole portions 19A, the side surface surface area Sm being changed by changing axial positions of the base end long side constituted by the straight radial line. Moreover, the second claw-shaped magnetic pole portions 19B and the second permanent magnets 20B are also similar.

Next, in an automotive rotary electric machine in which the rotor outside diameter is 105.5 mm, and the stator core outside diameter is 135.0 mm, the ratio (Sm/Sp) occupied by the side surface surface area (the cross-sectional area) Sm of the permanent magnets relative to the circumferential side surface surface area Sp of the claw-shaped magnetic pole portions was varied and the maximum torque increase during power running resulting from the addition of the permanent magnets was measured, the results being shown in FIG. 13. Moreover, the residual magnetic flux density (Br) of the permanent magnets is set such that the induced voltage during zero field current operation does not exceed the power supply system voltage.

From FIG. 13, it can be seen that as the magnet surface area ratio increases, the amount of increase in maximum torque increase during power running increases, when the magnet surface area ratio is approximately 0.9, the amount of increase in the maximum torque increase during power running reaches a maximum value at 6.5 Nm, and when the magnet surface area ratio exceeds 0.9, the amount of increase in the maximum torque increase during power running decreases.

Thus, by setting the ratio (Sm/Sp) between the side surface surface area of the claw-shaped magnetic pole portions and the surface area of the permanent magnets so as to satisfy an expression Sm/Sp≦1.0 (with consideration for irregularities in characteristics) while selecting a Br for the permanent magnets such that the induced voltage does not exceed the power supply system voltage during the zero field current operation, improved characteristics resulting from the most effective magnet shape can be obtained.

What is claimed is:

1. An automotive rotary electric machine comprising:
a rotor having:
  a rotor core having:
    a cylindrical boss portion;
    a first yoke portion disposed so as to extend radially outward from a first axial end of said boss portion;
    a second yoke portion disposed so as to extend radially outward from a second axial end of said boss portion;
    a plurality of first claw-shaped magnetic pole portions each disposed so as to extend toward said second axial end from said first yoke portion, arranged at a predetermined pitch in a circumferential direction, and having a radially-outermost circumferential surface shape formed so as to have a trapezoidal shape constituted by a tip end circumferential short side, a base end portion circumferential long side, and two oblique sides; and
    a plurality of second claw-shaped magnetic pole portions each disposed so as to extend toward said first axial end from said second yoke portion, arranged at a predetermined pitch in a circumferential direction, having a radially-outermost circumferential surface shape formed so as to have a trapezoidal shape constituted by a tip end circumferential short side, a base end portion circumferential long side, and two oblique sides, and arranged so as to alternate with said first claw-shaped magnetic pole portions in a circumferential direction; and
  a field winding installed on said boss portion,
  said rotor being disposed so as to be rotatable around a shaft inserted through a central axial position of said boss portion; a stator having:
    a cylindrical stator core; and
    a stator winding installed in said stator core,
  said stator core being disposed so as to surround said rotor core coaxially; and
  permanent magnets constituted by first and second permanent magnets disposed between each circumferentially-adjacent pair of said first and second claw-shaped magnetic pole portions so as to contact a circumferential side surface of said first and second claw-shaped magnetic pole portions,
  wherein an axial length ($L_1$) of said stator core relative to an axial distance ($L_2$) between facing end surfaces of said first and second yoke portions is constructed so as to satisfy an expression $L_1 > L_2$,
  wherein said first and second permanent magnets are each formed so as to have a cross-sectional shape positioned inside a circumferential side surface shape of said contacting first and second claw-shaped magnetic pole portions,
  wherein said first and second permanent magnets are each formed so as to have a shape matching a tip portion of said circumferential side surface shape of said contacting first and second claw-shaped magnetic pole portions; and
  wherein axial positions of a tip portion and a base end portion of said first permanent magnets are aligned with axial positions of a base end portion and a tip portion of said second permanent magnets respectively.

2. An automotive rotary electric machine comprising:
a rotor having:
  a rotor core having:
    a cylindrical boss portion;
    a first yoke portion disposed so as to extend radially outward from a first axial end of said boss portion;
    a second yoke portion disposed so as to extend radially outward from a second axial end of said boss portion;
    a plurality of first claw-shaped magnetic pole portions each disposed so as to extend toward said second axial end from said first yoke portion, arranged at a predetermined pitch in a circumferential direction, and having a radially outermost circumferential surface shape formed so as to have a trapezoidal shape constituted by a tip end circumferential short side, a base end portion circumferential long side, and two oblique sides; and
    a plurality of second claw-shaped magnetic pole portions each disposed so as to extend toward said first axial end from said second yoke portion, arranged at a predetermined pitch in a circumferential direction,
    having a radially outermost circumferential surface shape formed so as to have a trapezoidal shape constituted by a tip end circumferential long side, and two oblique sides, and arranged so as to alternate with said first claw-shaped magnetic pole portions in a circumferential direction; and
  a field winding installed on said boss portion,
  said rotor being disposed so as to be rotatable around a shaft inserted through a central axial position of said boss portion:
  a stator having:
    a cylindrical stator core; and a stator winding installed in said stator core,
said stator core being disposed so as to surround said rotor core coaxially; and
permanent magnets constituted by first and second permanent magnets disposed between each circumferentially adjacent pair of said first and second claw-shaped magnetic pole portions so as to contact a circumferential side surface of said first and second claw-shaped magnetic pole portions,
wherein an axial length ($L_1$) of said stator core relative to an axial distance ($L_g$) between facing end surfaces of said first and second yoke portions is constructed so as to satisfy an expression $L_1 > L_g$,
wherein said first and second permanent magnets are each formed so as to have a cross-sectional shape positioned inside a circumferential side surface shape of said contacting first and second claw-shaped magnetic pole portions, and
wherein a portion of each of said first and second permanent magnets facing an inner radial side of a root portion of said contacting first and second claw-shaped magnetic pole portions is cut away and removed.

3. The automotive rotary electric machine according to claim 2, wherein said first and second permanent magnets are each constructed so as to have a cross-sectional shape substantially aligned with a superposed surface in which facing circumferential side surfaces of said first and second claw-shaped magnetic pole portions overlap in a circumferential direction.

4. An automotive rotary electric machine comprising:
a rotor having:
a rotor core having:
a cylindrical boss portion;
a first yoke portion disposed so as to extend radially outward from a first axial end of said boss portion;
a second yoke portion disposed so as to extend radially outward from a second axial end of said boss portion;
a plurality of first claw-shaped magnetic pole portions each disposed so as to extend toward said second axial end from said first yoke portion, arranged at a predetermined pitch in a circumferential direction, and having a radially outermost circumferential surface shape formed so as to have a trapezoidal shape constituted by a tip end circumferential short side a base end portion circumferential long side, and two oblique sides; and
a plurality of second claw-shaped magnetic pole portions each disposed so as to extend toward said first axial end from said second yoke portion, arranged at a predetermined pitch in a circumferential direction, having a radially outermost circumferential surface shape formed so as to have a trapezoidal shape constituted by a tip end circumferential short side, a base end portion circumferential long side, and two oblique sides and arranged so as to alternate with said first claw-shaped magnetic pole portions in a circumferential direction; and
a field winding installed on said boss portion,
said rotor being disposed so as to be rotatable around a shaft inserted through a central axial position of said boss portion;
a stator having:
a cylindrical stator core; and
a stator core being disposed so as to surround said rotor core coaxially; and
permanent magnets constituted by first and second permanent magnets disposed between such circumferential adjacent pair of said first and second claw-shaped magnetic pole portions so as to contact a circumferential side surface of said first and second claw-shaped magnetic pole portions,
wherein an axial length ($L_1$) of said stator core relative to an axial distance ($L_g$) between facing end surfaces of said first and second yoke portions is constructed so as to satisfy an expression $L_1 > L_g$,
wherein said first and second permanent magnets are constructed such that each has a cross-sectional shape having a shape that is substantially similar to a circumferential side surface shape of said contacting first and second claw-shaped magnetic pole portions; and
a ratio (Sm/Sp) occupied by a surface area (Sm) of said first and second permanent magnets relative to a circumferential side surface surface area (Sp) of said first and second claw-shaped magnetic pole portions satisfies an expression $Sm/Sp \leq 1.0$.

* * * * *